United States Patent [19]

Navin et al.

[11] Patent Number: 4,880,150

[45] Date of Patent: Nov. 14, 1989

[54] FILLING MACHINE FOR DISPENSING PARTICULATE MATERIAL

[75] Inventors: James P. Navin, Racine; Ronald A. Shilhavy, Sturtevant; Gary M. Christensen, Kenosha, all of Wis.

[73] Assignee: Spee-Dee Packaging Machinery Inc., Sturtevant, Wis.

[21] Appl. No.: 199,854

[22] Filed: May 27, 1988

[51] Int. Cl.⁴ ............................................. G01F 11/10
[52] U.S. Cl. .................................... 222/346; 222/367; 222/427
[58] Field of Search ............... 222/344, 345, 346, 347, 222/367, 452, 427, 426, 368, 370, 429

[56] References Cited

U.S. PATENT DOCUMENTS

| | | | |
|---|---|---|---|
| 486,451 | 11/1892 | Espel | 222/346 |
| 1,818,780 | 8/1931 | Ayars | 222/345 |
| 2,366,379 | 1/1945 | Bemis | 222/346 |
| 2,588,483 | 3/1952 | Chapman | 222/367 |
| 2,966,285 | 12/1960 | Prickett et al. | 222/345 |
| 3,224,606 | 12/1965 | Schnyder | 222/427 |
| 3,602,401 | 8/1971 | Lense | 222/345 |

*Primary Examiner*—Joseph J. Rolla
*Assistant Examiner*—Kenneth Noland
*Attorney, Agent, or Firm*—James E. Nilles; Thomas F. Kirby

[57] ABSTRACT

A filling machine for repeatedly dispensing predetermined amounts of particulate material comprises a stationary hopper having two spaced-apart spouts; a motor-driven horizontally rotatable upper plate beneath the spouts and having four groups of receiving holes therethrough and a stationary bottom plate beneath the upper plate and having two groups of dispensing holes therethrough. As the upper plate is rotatably driven, the receiving holes align with the spouts, are filled with material, and then align with the dispensing holes through which the material then falls. A sweeper member above the upper plate directs excess material accumulated on the upper plate into emptied receiving holes approaching a spout. A weighted sleeve on each spout slidably engages the upper plate to inhibit material leakage. Each group of receiving holes has a cup plate on the underside of the upper plate with apertures in registery with the receiving holes and slidably engageable with extension tubes from the receiving holes. The cup plates slide on the rotating bottom plate to inhibit material leakage.

25 Claims, 5 Drawing Sheets

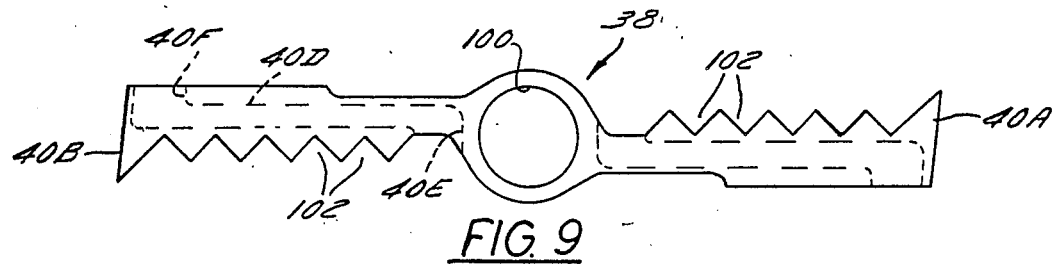
FIG. 9
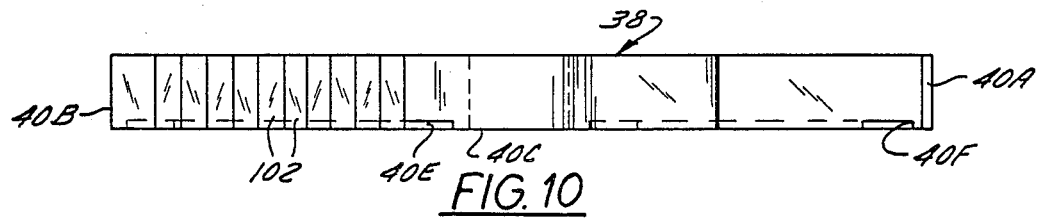
FIG. 10
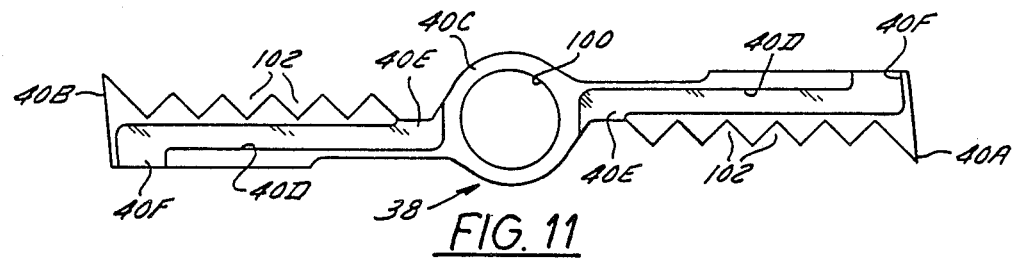
FIG. 11
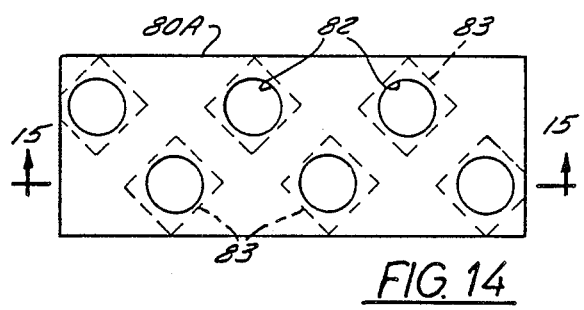
FIG. 14
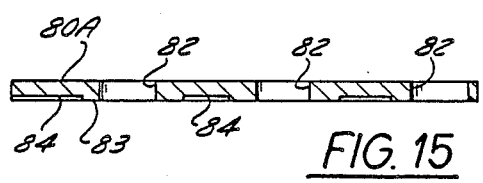
FIG. 15
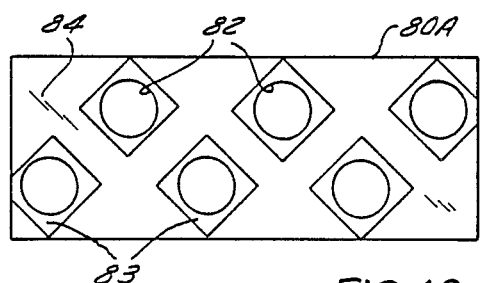
FIG. 16
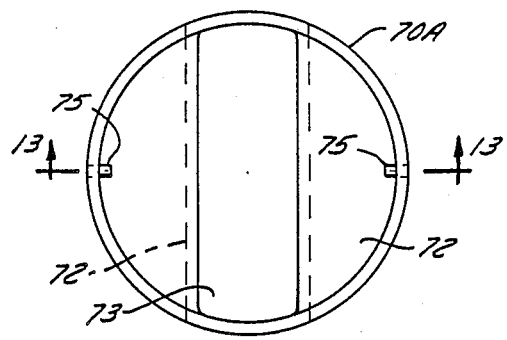
FIG. 12
FIG. 13

FILLING MACHINE FOR DISPENSING PARTICULATE MATERIAL

BACKGROUND OF THE INVENTION

1. Field of Use

This invention relates to filling machines for repeatedly dispensing relatively small predetermined quantities of flowable particulate material into containers such as boxes, cans or bags.

The material may, for example, take the form of powdered or granular industrial products such as chemicals, cleaning compounds or the like; prepared or unprepared food products such as condiments, seasonings, nuts, edible seeds and grains or the like; or agricultural or gardening products such as seeds, fertilizers or the like.

2. Description of the Prior Art

Several types of prior art filling machines of the aforesaid character are known and/or in use. One type comprises a hopper to be filled with particulate material and having a single hopper spout thereon for gravity feeding the material to a filling mechanism which repeatedly dispenses relatively small measured quantities of the material to individual containers passing beneath the mechanism. The mechanism comprises a rotatable horizontally disposed upper plate located immediately below the hopper spout and having a material receiving hole therethrough. Drive means are provided to rotate the upper plate. The mechanism also comprises a stationary horizontally disposed bottom plate located below the upper plate and having a material dispensing hole therethrough beneath which the containers pass. The dispensing hole is offset or displaced from (i.e., not in registering with) the hopper spout. When the upper plate rotates, the receiving hole passes beneath the hopper spout and momentarily stops thereat and the bottom plate cooperates with the upper plate to close off the lower end of the receiving hole and thereby define a chamber of predetermined volume into which material drops from the hopper spout. As the upper plate continues to rotate, the material-filled receiving hole passes beneath a horizontal wiping brush which has a brush surface flush with the upper surface of the upper plate. The brush operates to level off or sweep away any excess material protruding from the material-filled receiving hole so that only a predetermined measured volume of material remains in the receiving hole. As the upper plate rotates further, the material-filled receiving hole moves into registry with the dispensing hole in the bottom plate, momentarily stops thereat and the material in the receiving hole falls through the dispensing hole into a container therebeneath, whereupon upper plate rotation resumes to repeat the cycle.

The production capacity of the aforedescribed prior art filling machine can be and has been increased by providing a plurality of spaced-apart receiving holes in the upper plate which are circumferentially arranged around the axis of rotation of the upper plate. Further productivity increases have been achieved by using an upper plate having a plurality of receiving holes and by providing two or more circumferentially spaced apart hopper spouts and a corresponding plurality of circumferentially spaced apart dispensing holes in the bottom plate.

The foregoing types of prior art filling machines are generally satisfactory for their intended purposes but have certain drawbacks. For example, the need to periodically stop rotation of the upper plate as each receiving hole is filled and subsequently emptied, imposes upper limits on the rotational speed of the upper plate. Furthermore, the use of a brush to effect levelling of the material causes the excess material to be randomly scattered across the upper surface of the rotatable upper plate and this, depending on the nature of the particulate material being processed, can cause material build-up on the brush and/or clogging at the location whereat the end of the hopper spout interfaces with the relatively movable upper surface of the upper plate. In addition, if the particles in the particulate material being processed are relatively large and irregularly shaped, the brush bristles, clogged or unclogged, can randomly engage and dislodge material which should remain in a properly-filled receiving hole. Another problem in prior art machines involves leakage of powdered or finely-granulated material at the interface between the hopper spout and the upper surface of the upper plate and at the interface between the bottom of the filled receiving hole and the adjacent upper surface of the bottom plate.

It is desirable, therefore, to provide improved filling machines which overcome the aforesaid drawbacks and problems and have other advantages.

SUMMARY OF THE PRESENT INVENTION

A filling machine in accordance with one aspect of the invention for repeatedly dispensing predetermined amounts of flowable particulate material comprises: a stationary hopper having a spout; a rotatable upper plate located beneath the spout and rotatable about a vertical axis, said upper plate having a receiving hole therethrough which is radially offset from the axis and periodically alignable with the spout; and a stationary bottom plate located beneath the upper plate and having a dispensing hole therethrough which is radially offset from the axis and out of registry with the spout and periodically alignable with the receiving hole as the upper plate rotates. Drive means are provided to rotate the upper plate. Means are located above the upper plate for removing excess material from the upper plate as the upper plate rotates and moves the receiving hole from a position above the dispensing hole to a position beneath the spout. The last-recited means comprise a stationary wiper or pick-up member slidably engaged with the upper surface of the upper plate. First means comprising a movable sleeve on the spout are provided for inhibiting leakage of material from a space between the spout and the upper plate. Second means comprising a movable cup plate are provided for inhibiting leakage of material from a space adjacent the receiving hole between the upper plate and the bottom plate.

A filling machine in accordance with another aspect of the invention for repeatedly dispensing predetermined amounts of flowable particulate material comprises: a stationary hopper having a plurality of spouts; a horizontally rotatable upper plate located beneath the spouts and rotatable about a vertical axis, said upper plate having a plurality of groups of receiving holes therethrough, each of which groups is radially offset from the axis and periodically alignable with each of the spouts; and a stationary bottom plate located beneath the upper plate and having a plurality of groups of dispensing holes therethrough, each of which groups is radially offset from the axis and out of registery with either of the spouts and periodically alignable with each group of receiving holes as the upper plate rotates. Drive means are provided to rotate the upper plate. Means are located above the upper plate for removing excess material from the upper plate as the upper plate rotates and moves each group of receiving holes from a position above a group of dispensing holes to a position beneath a spout. The last-recited means comprises a stationary wiper or pick-up member which is slidably engageable with the upper surface of the upper plate and intersects the path of travel of each group of receiving holes. First means are provided for inhibiting leakage of material from a space between a spout and the upper plate. The first means comprises a sleeve surrounding a spout and slidably engageable with the upper plate, said sleeve being movable in the direction in which the axis extends. Second means are provided for inhibiting leakage of material from a space adjacent a group of receiving holes between the upper plate and the bottom plate. The second means comprises a plurality of cup plates, one for each group of receiving holes, mounted on the upper plate and having apertures in registery with adjacent groups of receiving holes. Each cup plate is slidably mounted on receiving hole extension tubes projecting from the upper plate and is slidably engageable with the bottom plate. Each cup plate is movable in the direction in which the extension tubes extend.

A filling machine in accordance with a preferred embodiment the invention provides several advantages over the prior art. For example, having two spouts, it operates to simultaneously fill two groups of receiving holes and, subsequently, to simultaneously dispense material from two groups of dispensing holes (comprising a total of twelve dispensing holes in the embodiment disclosed). Therefore, the machine is substantially more productive and efficient than prior art filling machines. The wiper or pick-up member is a single stationary component which directs excess material, after the receiving holes have been filled and emptied, into empty receiving holes before they again pass beneath a spout, instead of scattering the excess material over the upper surface of the upper plate, as is done by prior art wiping brushes. The first and second means for inhibiting or preventing leakage substantially reduce the amount of material leakage which could interfere with proper operation of the machine, and are self-adjusting to accommodate various types of particulate material which may have particles of different sizes. A filling machine in accordance with the invention is compact, simple in construction and mode of operation, and is relatively economical to fabricate and service.

Other objects and advantages of the invention will hereinafter appear.

DRAWINGS

FIGS. 9, 10 and 11 are top, side and bottom plan views, respectively, of a wiper or pick-up member shown in FIGS. 4, 5 and 6;

FIG. 12 is a top plan view of a spout sealing member or sleeve shown in FIGS. 4, 5 and 6;

FIG. 13 is a cross-section view taken on line 13—13 of FIG. 12;

FIG. 14 is an enlarged top plan view of one of the cup plate sealing members shown in FIGS. 4, 7 and 8;

FIG. 15 is a cross-section view taken on line 15—15 of FIG. 14; and

FIG. 16 is a bottom plan view of the cup plate shown in FIGS. 14 and 15.

DESCRIPTION OF A PREFERRED EMBODIMENT

Figure 1:
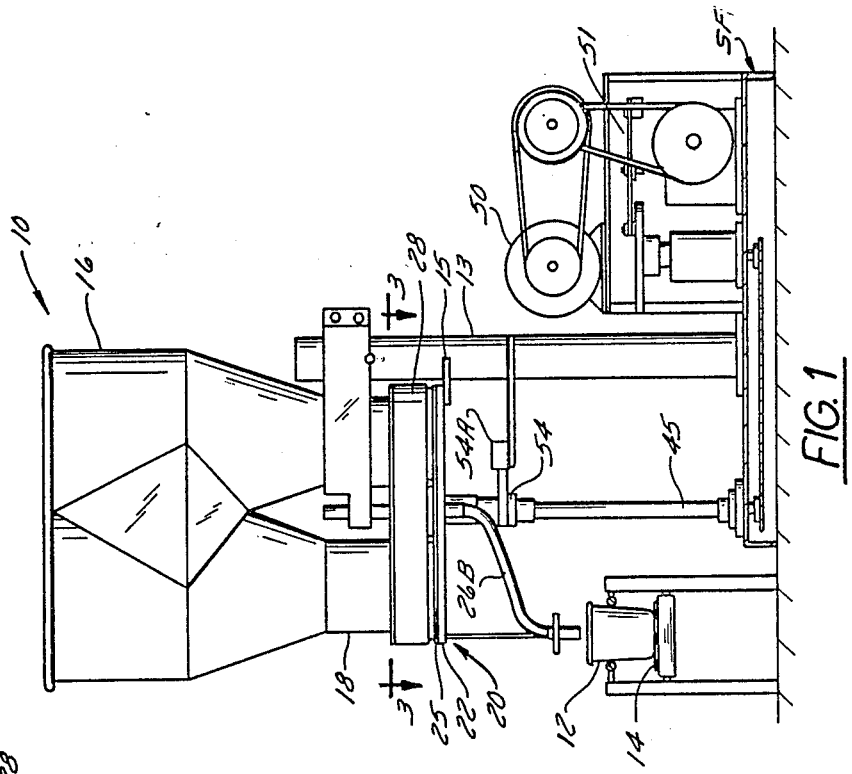
FIG. 1 is a side elevation view of a filling machine in accordance with the invention.
Figure 3:
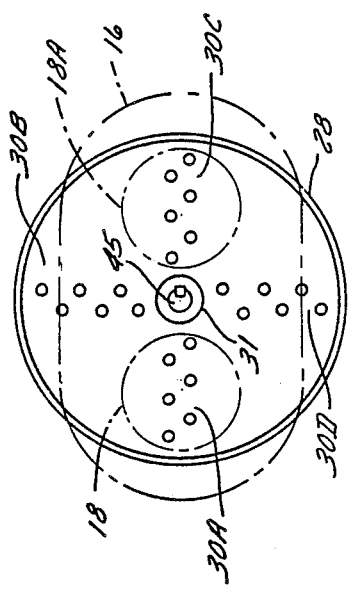
FIG. 3 is a cross-section view taken on line 3—3 of FIG. 1.
Figure 2:
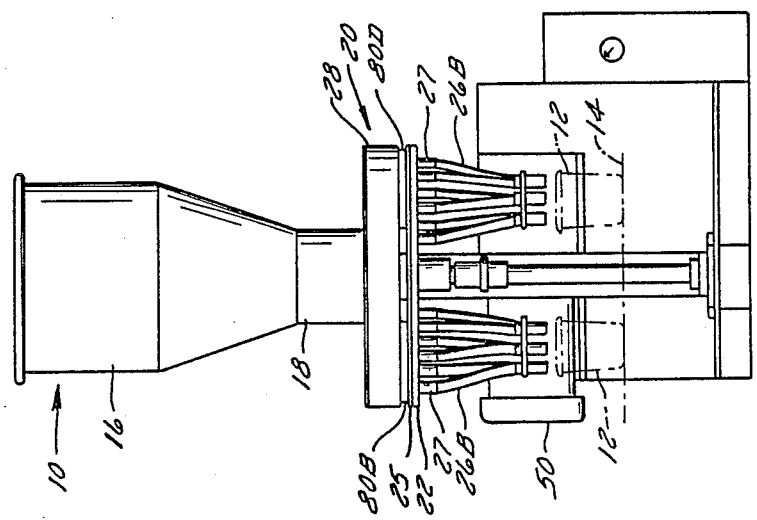
FIG. 2 is a front elevation view of the filling machine of FIG. 1.

FIGS. 1 and 2 show a filling machine 10 in accordance with the invention for repeatedly dispensing relatively small predetermined quantities of flowable particulate material into containers 12 such as boxes, cans or bags which move along a conveyor 14.

The particulate material may, for example, take the form of powdered or granular industrial products such as chemicals, cleaning compounds or the like; prepared or unprepared food products such as condiments, seasonings, nuts, edible seeds and grains or the like; or agricultural or gardening products such as seeds, fertilizers or the like.

Filling machine 10 comprises a support frame SF including a support column 13 and a hopper 16 thereon which is adapted to be filled with particulate material and which has two hopper spouts 18 and 18A thereon for gravity feeding the material to a filling mechanism 20 therebelow which repeatedly dispenses relatively small measured quantities of the material to the individual containers 12 passing beneath the mechanism. Each spout 18, 18A takes the form of a hollow cylindrical member which is open at its lower end and which has two slots 19 extending upwardly from its lower edge. Sleeves 70A and 70B are mounted on the spouts 18 and 18A, respectively.

Figure 4:
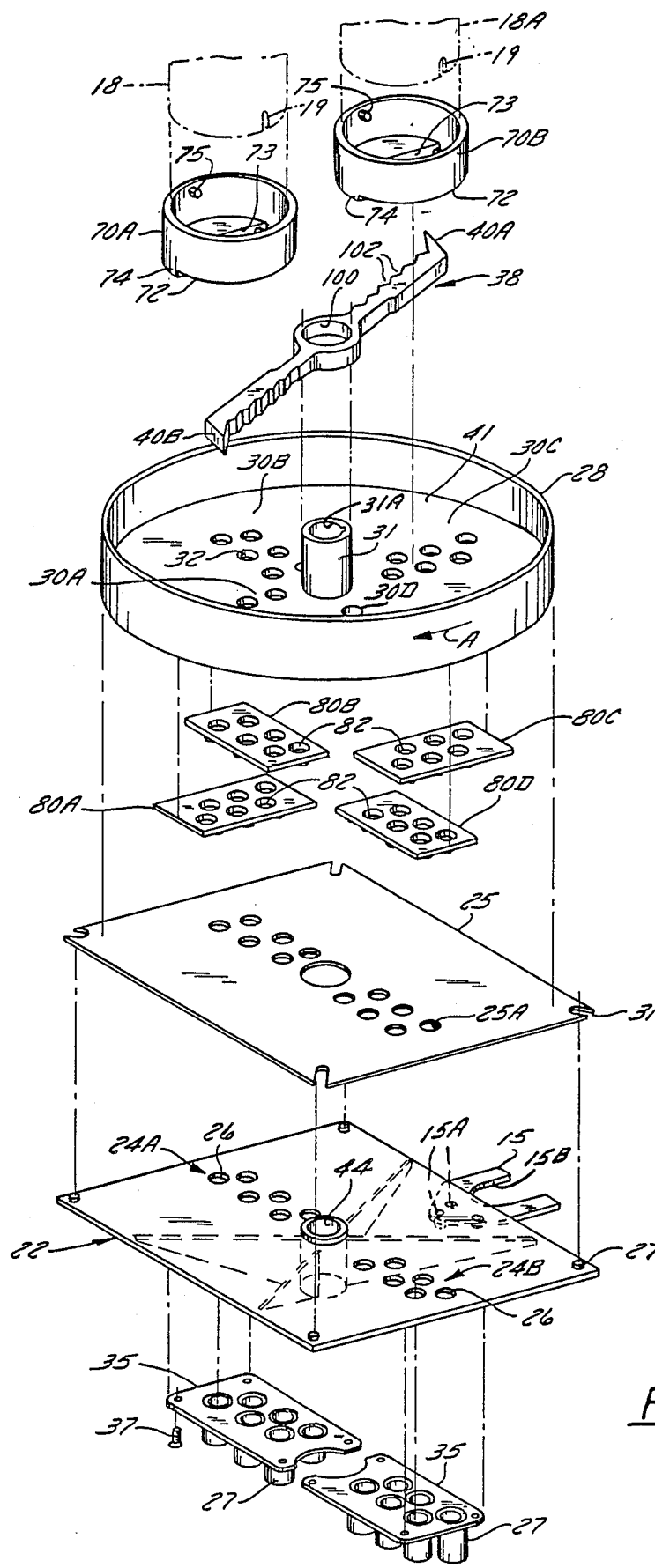
FIG. 4 is an enlarged exploded perspective view of the filling mechanism of the filling machine shown in FIGS. 1, 2 and 3.

As FIG. 4 shows, mechanism 20 comprises a rotatable horizontally disposed upper plate 28 located immediately below the hopper spouts 18 and 18A and having four groups 30A, 30B, 30C and 30D of material receiving holes 32 therethrough. Upper plate 28 is provided with a central hub 31 having a hole 31A therethrough and an integrally formed upwardly extending rim 29 to confine particulate material disposed on plate 28 during operation of the machine. Preferably, plate 28 is fabricated of aluminum and the upper surface 41 of plate 28 and the inner surface of rim 29 are "teflon" coated to reduce friction. Each receiving hole 32 is defined by the bore of an extension tube 33, best seen in FIGS. 7 and 8, which is press-fitted in a hole in upper plate 28 and is flush with upper surface 41 but extends below the lower surface 43 of upper plate 28.

Figure 8:
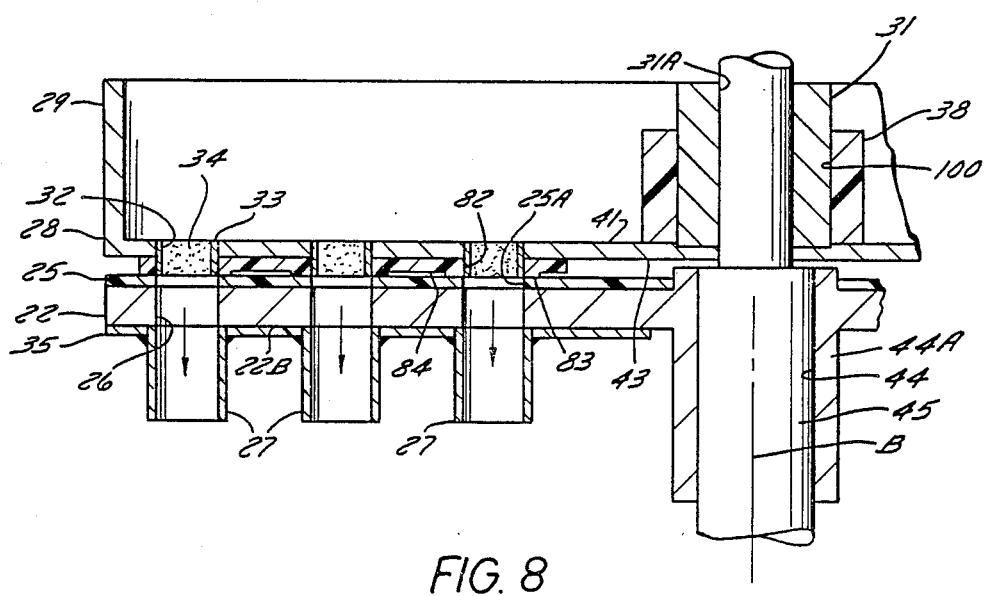
FIG. 8 is a cross-section view similar to FIG. 7 and showing the components in the dispensing position.

Mechanism 20 also comprises a stationary horizontally disposed bottom plate 22 located below upper plate 28 and having two groups 24A and 24B of dispensing holes 26 therethrough beneath which the containers 12 pass. The groups 24A and 24B of dispensing holes 26 are offset or displaced from (i.e., not in registering with) the two hopper spouts 18 and 18A. Bottom plate 22 is fabricated of steel or aluminum and has a thin flat friction-reducing sheet 25, of nylon for example, rigidly secured to the upper surface of bottom plate 22. Sheet 25 has holes 25A which register with the previously mentioned dispensing holes 26 in bottom plate 22. Sheet 25 is affixed to bottom plate 22 by studs 27 on plate 22 which engage slots 31 in sheet 25. As FIG. 8 shows, each dispensing hole 26 is provided with an extension tube 27 which is flush with the lower surface 22B of bottom plate 22. For convenience, the extension tubes 27 for each group 24A, 24B of dispensing holes 26 are rigidly secured as by welding in an apertured metal plate 35. Each plate 35 is secured by screws 37 (FIG. 4) to the underside 22B of bottom plate 22, which has a central opening 44.

Bottom plate 22 has a hub 44A with a central opening therethrough (see FIGS. 4, 7 and 8) for accommodating a rotatable drive shaft 45 therethrough. Bottom plate 22 is not rotatable but is mounted on shaft 45 so that it can move vertically and floatingly on shaft 45. Rotation of bottom plate 22 is prevented by means of bracket 15 (FIGS. 1 and 4) which is rigidly secured to an edge of plate 22 by screws 15A (FIG. 4) and which has a slot 15B for slidably receiving and engaging support column 13.

Upper plate 28 is mounted on drive shaft 45 and secured thereto by a key 45A (FIG. 7) so as to be rotatably driven in the direction of an arrow A (FIGS. 4, 5 and 6) by a drive means shown in FIG. 1 and so as to be vertically immovable relative to shaft 45. Key 45A engages slots 45B and 45C, respectively, in shaft 45 and in hub 31 on upper plate 28. The drive means, which is mounted on support frame SF, comprises an electric motor 50 which is connected to drive a Geneva mechanism 51 which, in turn, effects rotation of drive shaft 45. Motor 50 runs continually but Geneva mechanism 51 causes shaft 45 to rotate in the direction of arrow A but to periodically stop at predetermined locations for predetermined intervals of time. Thus, in the embodiment disclosed, during one 360° rotation of shaft 45 and upper plate 28 driven thereby, plate 28 stops four times, as hereafter explained. The Geneva mechanism 51 is constructed and operates so that plate 28 rotates at a predetermined maximum speed, slows down, momentarily stops, speeds up, and resumes maximum speed according to a preferred sinusoidal operational curve.

Means are provided to enable bottom plate 22 to be adjustably movable axially (vertically) for a short distance relative to vertically stationary (but rotatable) upper plate 28 so as to change and adjust the volumetric capacity of the receiving holes 32, as hereafter explained. Such means comprise adjustable threaded coupling 54 on drive shaft 45 (see FIG. 1) which can be adjusted either manually or automatically by means of a selectively operable electric motor-driven adjustment drive mechanism 54A (FIG. 1) mounted on support frame SF and connected to coupling 54.

Figure 5:
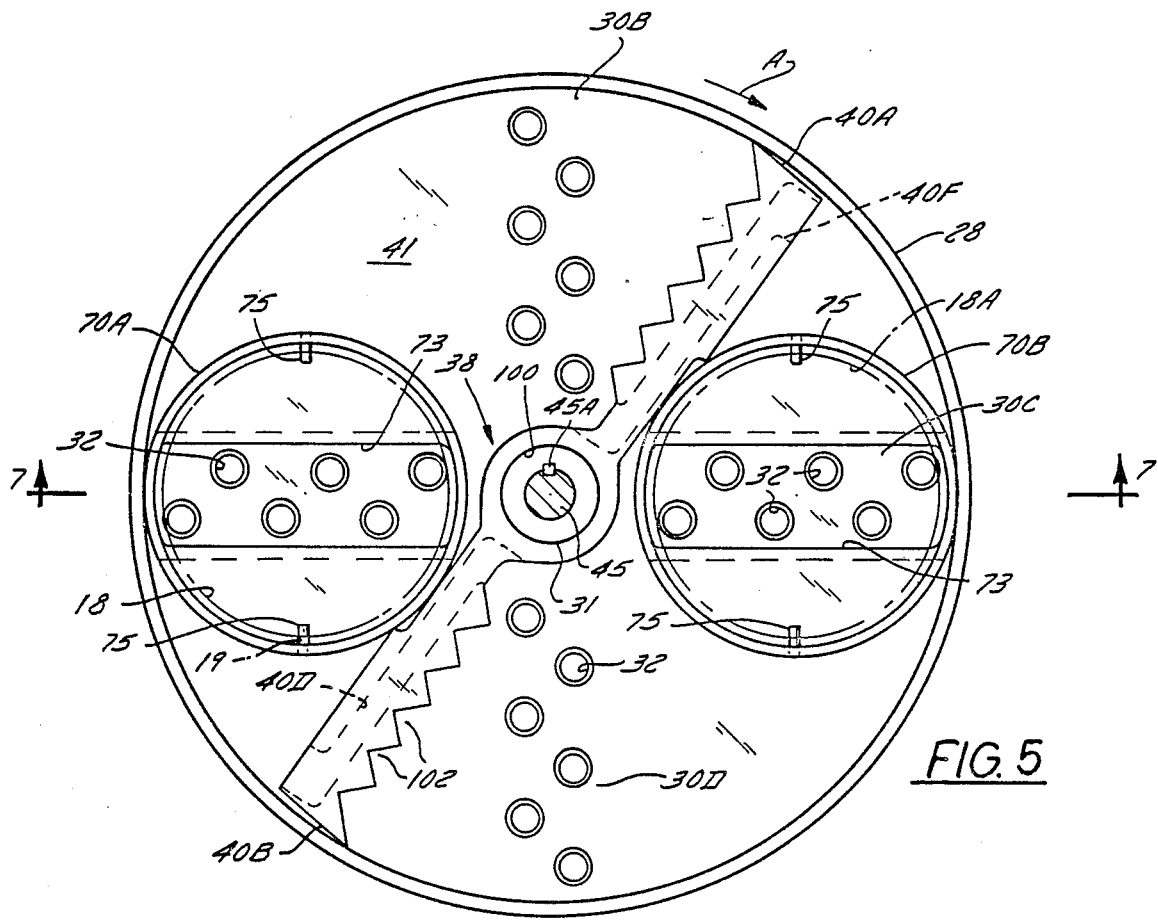
FIG. 5 is an enlarged view, similar to FIG. 3, but including additional components and showing the components of the filling mechanism located in filling position.
Figure 7:
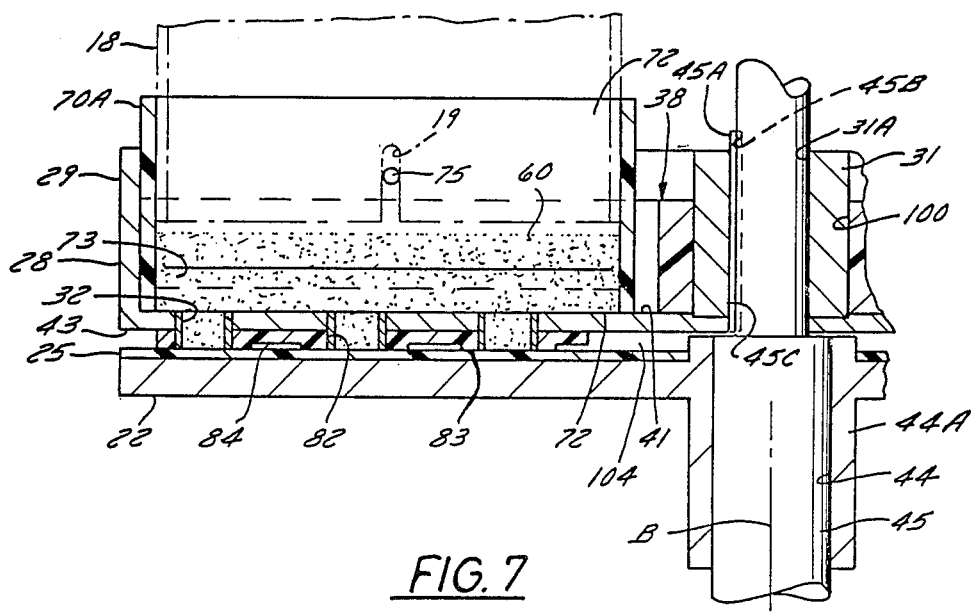
FIG. 7 is an enlarged cross-section view taken on line 7—7 of FIG. 5 and showing the components in the filling position.

When upper plate 28 rotates, a group of receiving holes 32 passes beneath a hopper spout 18 or 18A and momentarily stops thereat. Bottom plate 22 cooperates with upper plate 28 to close off the lower end of the receiving holes 32 (i.e., the lower end of the tubes 33) and thereby defines a plurality of chambers 34 (see FIGS. 7 and 8) of predetermined volume into which material drops from the hopper spout 18 and 18A, as FIGS. 5 and 7 show.

As upper plate 28 rotates further, the group of material-filled receiving holes 32 moves into registry with a group of dispensing holes 26 in bottom plate 22 (see FIG. 8), momentarily stops thereat and the material in the group of receiving holes 32 falls through the group of dispensing holes 26 into a container 12 therebeneath, whereupon upper plate rotation resumes.

As upper plate 28 continues to rotate (compare FIGS. 5 and 6), the group of receiving holes 32, now empty but again closed, pass beneath a horizontally disposed wiping or sweeping member 38 which has an under surface 40C flush with the upper surface 41 of upper plate 28. Member 38 operates to deposit any excess material remaining on upper plate 28 into the empty receiving holes 32 in the group passing therebeneath and thereby cleans the upper plate 28 of excess material.

As previously mentioned, filling machine 10 comprises: the stationary hopper 16 having a plurality of (two) spaced apart spouts 18 and 18A; the rotatable upper plate 28 located below the spouts and comprising a plurality of (four) spaced apart groups 30A, 30B, 30C and 30D of receiving holes 32; means such as a motor-driven Geneva drive mechanism 40 to effect periodic rotation of upper plate 28 in one direction (arrow A in FIG. 4) about a vertical axis B (FIG. 4); the stationary sweeping or wiper member 38 extending across rotatable upper plate 28; and the stationary bottom plate 22 located below upper plate 28 and comprising a plurality of (two) spaced apart groups 24A and 24B of dispensing holes 26.

Figure 6:
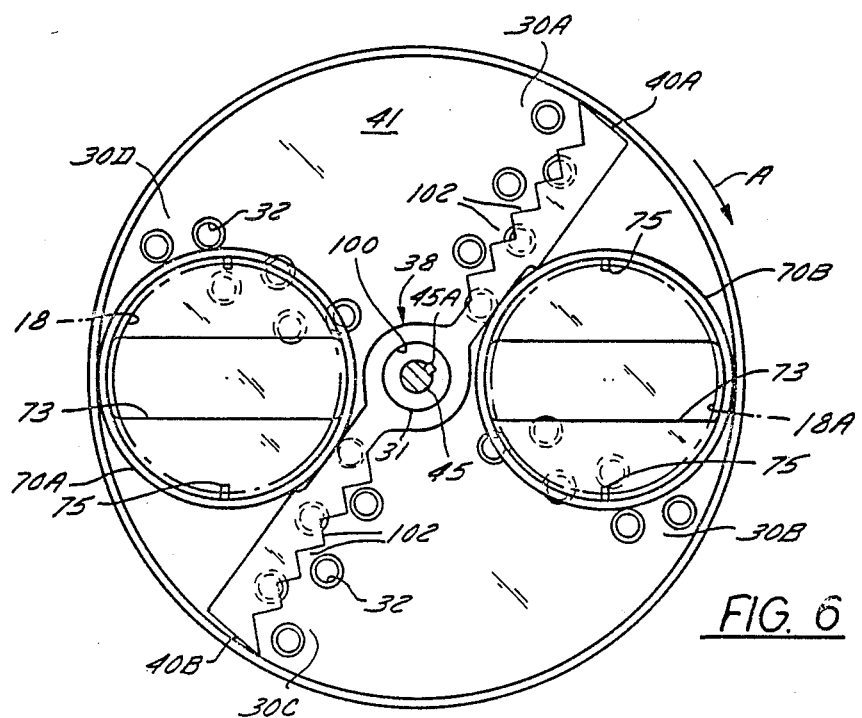
FIG. 6 is a view similar to FIG. 5 showing certain components located in another position.

As FIGS. 5 and 6 show, wiper member 38 takes the form of a single stationary member which extends across and rides on upper surface 41 of upper plate 28 and has oppositely extending arms 40A and 40B. As FIGS. 9, 10 and 11 show, wiper member 38, which is preferably fabricated of a single piece of nylon so as to reduce friction between its underside 40C and upper surface 41 of upper plate 28 on which it rides, is provided with a central opening 100 which adapts it to be slidably mounted on hub 31 at the center of upper plate 28. Each arm 40A, 40B is provided with a serrated front edge which confronts an on-coming group of receiving holes 32. Each notch 102 in a serrated edge is aligned with a receiving hole 32. Thus, six notches 102 are provided to accommodate the six receiving holes 32 in a group. The underside 40C of wiper member 38 is provided with an elongated groove or recess 40D which is open at both ends as at 40E and 40F in FIG. 11. Excess particulate material which accumulates at upper surface 41 of plate 28 and is not redirected into receiving holes 32 passing therebeneath is able to enter opening 40E, pass through groove 40D and exit at opening 40F and this prevents accumulated material from interferring with operation of wiper member 38 as plate 28 rotates, as by causing member 38 to rise.

As FIGS. 5 and 6 show, each group 30A, 30B, 30C and 30D of receiving holes comprises a plurality of (six) receiving holes 32 and each group 24A and 24B of dispensing holes comprises a plurality of (six) dispensing holes 26. The two spouts 18 and 18A which are located on opposite sides of vertical axis B and radially spaced therefrom, are equidistantly spaced apart from each other angularly by 180°. The four groups 30A–30D of receiving holes, which are located on different sides of axis B and radially spaced therefrom, are equidistantly spaced apart from each other angularly by 90°. The two groups 24A and 24B of dispensing holes, which are located on opposite sides of vertical axis B and radially spaced therefrom are equidistantly spaced apart from each other angularly by 180° and are angularly offset from the spouts 18 and 18A by 90°.

Referring to FIGS. 5 and 6, in operation, as upper plate 28 rotates, one group 30A of receiving holes 32 moves to and momentarily stops at one hopper spout 18 whereat the receiving holes 32 in group 30A are simultaneously filled. Upper plate 28 then resumes rotation and the filled receiving holes 32 in group 32A move out from beneath an edge of the undersurface of a sleeve 70A, hereinafter described, whereby the material therein is levelled. Then, group 30A of receiving holes 32 moves to and momentarily stops above one group 24A of dispensing holes 26 whereat the material falls from the receiving holes in group 30A and through the dispensing holes in group 24A into a plurality of containers 12 therebelow. Each dispensing hole 26 may discharge directly into an individual container 12 or through a tube, such as 26B (FIGS. 1 and 2) into an individual container. In the embodiment shown, the several dispensing holes 26 in a group 24A or 24B are connected by tubes 26B to discharge into a common container 12.

After group 30A of receiving holes 32 moves past the group 24A of dispensing holes 26, those receiving holes are then closed, and the group 30A moves beneath an arm 40A of wiper member 38 which sweeps excess material it has collected from upper plate 28 into the closed receiving holes 32 in group 24A before that group 24A passes beneath sleeve 70B of spout 18A.

As the group 30A of receiving holes 32 operates as abovedescribed, the opposite group 30C of receiving holes 32 is cooperating with the other hopper spout 18A, with the other arm 40B of wiper member 38, and with the other group 24B of dispensing holes 26 in the same manner.

Referring now to FIGS. 4 through 16, filling machine 10 further comprises first means, including sleeves 70A and 70B, to prevent leakage of material from a space 60 (see FIG. 7) whereat the lower end of hopper pout 18 (or 18A) interfaces with upper surface 41 of rotatable upper plate 28. Machine 10 also comprises second means, including four cup plates 80A, 80B, 80C and 80D, to prevent leakage of material from the space 104 (see FIGS. 7 and 8) whereat the lower ends of the tubes 33 of the receiving holes interface with sheet 25 defining the upper surface of stationary bottom plate 22. The second means also prevents such leakage from occurring as upper plate 28 is adjustably moved axially relative to stationary lower plate 22.

The tubular sleeves 70A and 70B are slidably mounted for vertical movement on the lower ends of the spouts 18 and 18A. As FIGS. 7, 12 and 13 show, sleeve 70A which is identical to sleeve 70B, has an end face 72 with an aperture 73 therein. A rim 74 on end face 72 around aperture 73 slidably bears against upper surface 41 of rotatable upper plate 28. Material from hopper 16 is directed by the sleeves 70A and 70B into a group of receiving holes 32 therebeneath through the aperture 73 in end face 72. Each sleeve 70A and 70B is axially movable on its respective spout 18 and 18A and is heavy enough to bear firmly against upper surface 41 of upper plate 28. Each sleeve 70A and 70B is provided with a pair of projections 75 on its inside wall which engage the slots 19 in its associated spout. This construction enables aperture 73 to maintain proper orientation with respect to a group of receiving holes 32 passing therebeneath and also allows the sleeve to adjust itself axially on its respective spout.

As FIG. 4 shows, the said second means comprises a plurality of (four) cup plates 80A, 80B, 80C and 80D, one cup plate for each group 30A, 30B, 30C and 30D of receiving holes 32, respectively. As FIGS. 14, 15 and 16 show, cup plate 80A (which is identical to cup plates 80B, 80C and 80D) takes the form of a rectangular metal plate having a plurality of (six) apertures 82 therethrough. As FIGS. 7 and 8 make clear, the cup plates 80A–80D are mounted on the underside of and are movable with rotatable upper plate 28. Thus, the apertures 82 in each cup plate 80A–80D register with the extension tubes 33 of the plurality of receiving holes 32 in its associated group of receiving holes. Each extension tube 33 is slidably received in a corresponding aperture 82 in a cup plate. Each cup plate 80A–80D is mounted for slight vertical sliding movement relative to upper plate 28 and has an underface 83 which slidably bears against sheet 25 on the upper surface of stationary bottom plate 22. Each cup plate 80A–80D has grooves 84 (FIGS. 7, 8, 15 and 16) formed in its underside to accommodate passage therethrough of material which may collect on sheet 25 on bottom plate 22 and would otherwise cause the cup plates to rise.

As is apparent, filling machine 10 operates to simultaneously fill two groups of receiving holes and, subsequently, to simultaneously dispense material from two groups of dispensing holes (comprising a total of twelve holes in the embodiment disclosed). The levelling or wiper member 38 is a single stationary component which effects simultaneous levelling of material in a plurality of groups of receiving holes and operates to direct excess material into any receiving hole which is only partially filled. The leakage preventing means, which substantially reduce the amount of leakage which could interfere with proper operation of the machine, are self-adjusting in response to gravity.

If preferred, filling machine 10 may be provided with a housing (not shown) which surrounds mechanism 20 to confine and contain any stray material escaping from upper plate 28 or from between the plates 28 and 22 and thereby prevent the material from contaminating the area round the filling machine.

We claim:

1. A filling machine for repeatedly dispensing predetermined amounts of flowable particulate material comprising:

a stationary hopper having a spout;

a rotatable upper plate beneath said spout and rotatable about a vertical axis, said upper plate having a receiving hole therethrough which is radially offset from said axis and alignable with said spout;

a stationary bottom plate beneath said upper plate and having a dispensing hole therethrough which is radially offset from said axis and out of registery with said spout and alignable with said receiving hole;

said receiving hole being movable as said upper plate rotates between one position where said receiving hole is aligned with said about but not with said dispensing hole and another position wherein said receiving hole is aligned with said dispensing hole but not with said spout;

said flowable particulate material flowing under the force of gravity from said spout into said receiving hole when said receiving hole is in said one position and said flowable particulate material flowing under the force of gravity from said receiving hole into and through said dispensing hole when said receiving hole is in said another position;

means above said upper plate for directing excess material accumulated on said upper plate into said receiving hole after said receiving hole moves from said another position above said dispensing hole toward said spout but before said receiving hole reaches said one position;

and first means for inhibiting leakage of said material from a space between said spout and said upper plate.

2. A filling machine according to claim 1 including second means for inhibiting leakage of said material from a space adjacent said receiving hole between said upper plate and said bottom plate.

3. A filling machine according to claim 2 wherein said first means comprises a sleeve surrounding said spout and slidably engageable with said upper plate, said sleeve being movable in the direction in which said axis extends.

4. A filling machine according to claim 3 wherein said second means comprises a member mounted on said upper plate and having an aperture in registry with said receiving hole and slidably engageable with said bottom plate, said member being movable in the direction in which said axis extends.

5. A filling machine according to claim 2 wherein said second means comprises a member mounted on said upper plate and having an aperture in registry with said receiving hole and slidably engageable with said bottom plate, said member being movable in the direction in which said axis extends.

6. A filling machine for repeatedly dispensing predetermined amounts of flowable particulate material comprising:

a stationary hopper having a spout;

a rotatable upper plate beneath said spout and rotatable about a vertical axis, said upper plate having a receiving hole therethrough which is radially offset from said axis and alignable with said spout;

a stationary bottom plate beneath said upper plate and having a dispensing hole therethrough which is radially offset from said axis and out of registery with said spout and alignable with said receiving hole;

said receiving hole being movable as said upper plates rotates between one position wherein said receiving hole is aligned with said spout but not with said dispensing hole and another position wherein said receiving hole is aligned with said dispensing hole but not with said spout;

said flowable particulate material flowing under the force of gravity from said spout into said receiving hole when said receiving hole is in said one position and said flowable particulate material flowing under the force of gravity from said receiving hole into and through said dispensing hole when said receiving hole is in said another position;

means above said upper plate for directing excess material accumulated on said upper plate into said receiving hole after said receiving hole moves from said another position above said dispensing hole toward said spout; but before said receiving hole reaches said one position;

said means above said upper plate comprising a stationary member slidably engageable with said upper plate and intersecting a path of travel of said receiving hole.

7. A filling machine according to claim 6 including a rotatable cylindrical projection located on said axis and projecting upwardly from said upper plate; and wherein said stationary member of said means above said upper plate has a hole therein for receiving said projection.

8. A filling machine for repeatedly dispensing predetermined amounts of flexible particulate material comprising:

a stationary hopper having a plurality of spouts;

a rotatable upper plate beneath said spouts and rotatable about a vertical axis, said upper plate having a plurality of receiving holes therethrough, each of which is radially offset from said axis and alignable with said spouts;

a stationary bottom plate beneath said upper plate and having a plurality of dispensing holes therethrough, each of which is radially offset from said axis and out of registry with either of said spouts and alignable with each of said plurality of receiving holes;

said receiving holes being movable at said upper plate rotates between one position wherein the receiving holes are aligned with one of said spouts but not with said dispensing holes and another position wherein the receiving holes are aligned with said dispensing holes but not with either of said spouts;

said flowable particulate material flowing under the force of gravity from said spout into said receiving holes when said receiving holes are in said one position and said flowable particulate material flowing under the force of gravity from said receiving holes into and through said dispensing holes when said receiving holes are in said another position;

and means above said upper plate for directing excess material accumulated on said upper plate into said receiving holes after said receiving holes move from said another position above said dispensing holes toward said spouts but before said receiving holes reach said one position.

9. A filling machine according to claim 8 wherein said means comprises a stationary member slidably engageable with said upper plate and intersecting the path of travel of each receiving hole.

10. A filling machine according to claim 8 including first means for inhibiting leakage of said material from a space between a spout and said upper plate.

11. A filling machine according to claim 10 including second means for inhibiting leakage of said material from a space adjacent said receiving hole between said upper plate and said bottom plate.

12. A filling machine according to claim 11 wherein said first means comprises a sleeve surrounding said spout and slidably engageable with said upper plate, said sleeve being movable in the direction in which said axis extends.

13. A filling machine according to claim 12 wherein said second means comprises a member mounted on said upper plate and having an aperture in registry with said receiving hole and slidably engageable with said bottom plate, said member being movable in the direction in which said axis extends.

14. A filling machine for repeatedly dispensing predetermined amounts of flowable particulate material comprising:
- a stationary hopper having a spout;
- a rotatable upper plate beneath said spout and rotatable about a vertical axis, said upper plate having a receiving hole therethrough which is radially offset from said axis and alignable with said spout;
- a stationary bottom plate beneath said upper plate and having a dispensing hole therethrough which is radially offset from said axis and out of registry with said spout and alignable with said receiving hole;
- means above said upper plate for directing excess material accumulated on said upper plate into said receiving hole after said receiving hole moves from a position above said dispensing hole toward said spout;
- first means for inhibiting leakage of said material from a space between said spout and said upper plate; and
- second means for inhibiting leakage of said material from a space adjacent said receiving hole between said upper plate and said bottom plate.

15. A filling machine according to claim 14 wherein said first means comprises a sleeve surrounding said spout and slidably engageable with said upper plate, said sleeve being movable in the direction in which said axis extends.

16. A filling machine according to claim 14 or 15 wherein said second means comprises a member mounted on said upper plate and having an aperture in registry with said receiving hole and slidably engageable with said bottom plate, said member being movable in the direction in which said axis extends.

17. A filling machine for repeatedly dispensing predetermined amounts of flowable particulate material comprising:
- a stationary hopper having a plurality of spouts;
- a rotatable upper plate beneath said spouts and rotatable about a vertical axis, said upper plate having a plurality of receiving holes therethrough, each of which is radially offset from said axis and alignable with said spouts;
- a stationary bottom plate beneath said upper plate and having a plurality of dispensing holes therethrough, each of which is radially offset from said axis and out of registery with either of said spouts and alignable with each of said plurality of receiving holes;
- first means for inhibiting leakage of said material from a space between a spout and said upper plate;
- second means for inhibiting leakage of said material from a space adjacent said receiving holes between said upper plate and said bottom plate;
- and means above said upper plate for directing excess material accumulated on said upper plate into said receiving holes after said receiving holes move from a position above said dispensing holes toward said spouts, said means above said upper plate comprising a stationary member slidably engageable with said upper plate and intersecting the path of travel of each receiving hole.

18. A filling machine according to claim 17 wherein said first means comprises a sleeve surrounding a spout and slidably engageable with said upper plate, said sleeve being movable in the direction in which said axis extends.

19. A filling machine according to claim 18 wherein said second means comprises a member mounted on said upper plate and having apertures in registry with said receiving holes and slidably engageable with said bottom plate, said member being movable in the direction in which said axis extends.

20. A filling machine for repeatedly dispensing predetermined amounts of flowable particulate material comprising:
- a stationary hopper having a spout;
- a rotatable upper plate beneath said spout and rotatable about a vertical axis, said upper plate having a receiving hole therethrough which is radially offset from said axis and alignable with said spout;
- a stationary bottom plate beneath said upper plate and having a dispensing hole therethrough which is radially offset from said axis and out of registry with said spout and alignable with said receiving hole;
- said receiving hole being movable as said upper plate rotates between one position wherein said receiving hole is aligned with said spout but not with said dispensing hole and another position wherein said receiving hole is aligned with said dispensing hole but not with said spout;
- means above said upper plate for directing excess material accumulated on said upper plate into said receiving hole after said receiving hole moves from said another position above said dispensing hole toward said spout;
- first means for inhibiting leakage of said material from a space between said spout and said upper plate;
- and second means for inhibiting leakage of said material from a space adjacent said receiving hole between said upper plate and said bottom plate.

21. A filling machine according to claim 20 wherein said first means comprises a sleeve surrounding said spout and slidably engageable with said upper plate, said sleeve being movable in the direction in which said axis extends.

22. A filling machine according to claim 20 or 21 wherein said second means comprises a member mounted on said upper plate and having an aperture in registry with said receiving hole and slidably engageable with said bottom plate, said member being movable in the direction in which said axis extends.

23. A filling machine for repeatedly dispensing predetermined amounts of flowable particulate material comprising:
- a stationary hopper having a plurality of spouts;
- a rotatable upper plate beneath said spouts and rotatable about a vertical axis, said upper plate having a plurality of receiving holes therethrough, each of which is radially offset from said axis and alignable with said spouts;
- a stationary bottom plate beneath said upper plate and having a plurality of dispensing holes therethrough, each of which is radially offset from said axis and out of registry with either of said spouts and alignable with each of said plurality of receiving holes;
- said receiving holes being movable as said upper plate rotates between one position wherein the receiving holes are aligned with one of said spouts but not with said dispensing holes and another position wherein the receiving holes are aligned with said dispensing holes but not with either of said spouts;

means above said upper plate for directing excess material accumulated on said upper plate into said receiving holes after said receiving holes move from said another above said dispensing holes toward said spouts, said means comprising a stationary member slidably engageable with said upper plate and intersecting the path of travel of each receiving hole;

first means for inhibiting leakage of said material from a space between a spout and said upper plate;

and second means for inhibiting leakage of said material from a space adjacent said receiving hole between said upper plate and said bottom plate.

24. A filling machine according to claim 23 wherein said first means comprises a sleeve surrounding said spout and slidably engageable with said upper plate, said sleeve being movable in the direction in which said said axis extends.

25. A filling machine according to claim 24 wherein said second means comprises a member mounted on said upper plate and having an aperture in registry with said receiving holes and slidably engageable with said bottom plate, said member being movable in the direction in which said axis extends.

* * * * *